Dec. 2, 1958 J. H. GUYTON 2,863,044
SENSITIVITY CONTROL FOR SIGNAL SEEKING TUNERS
Filed April 21, 1954
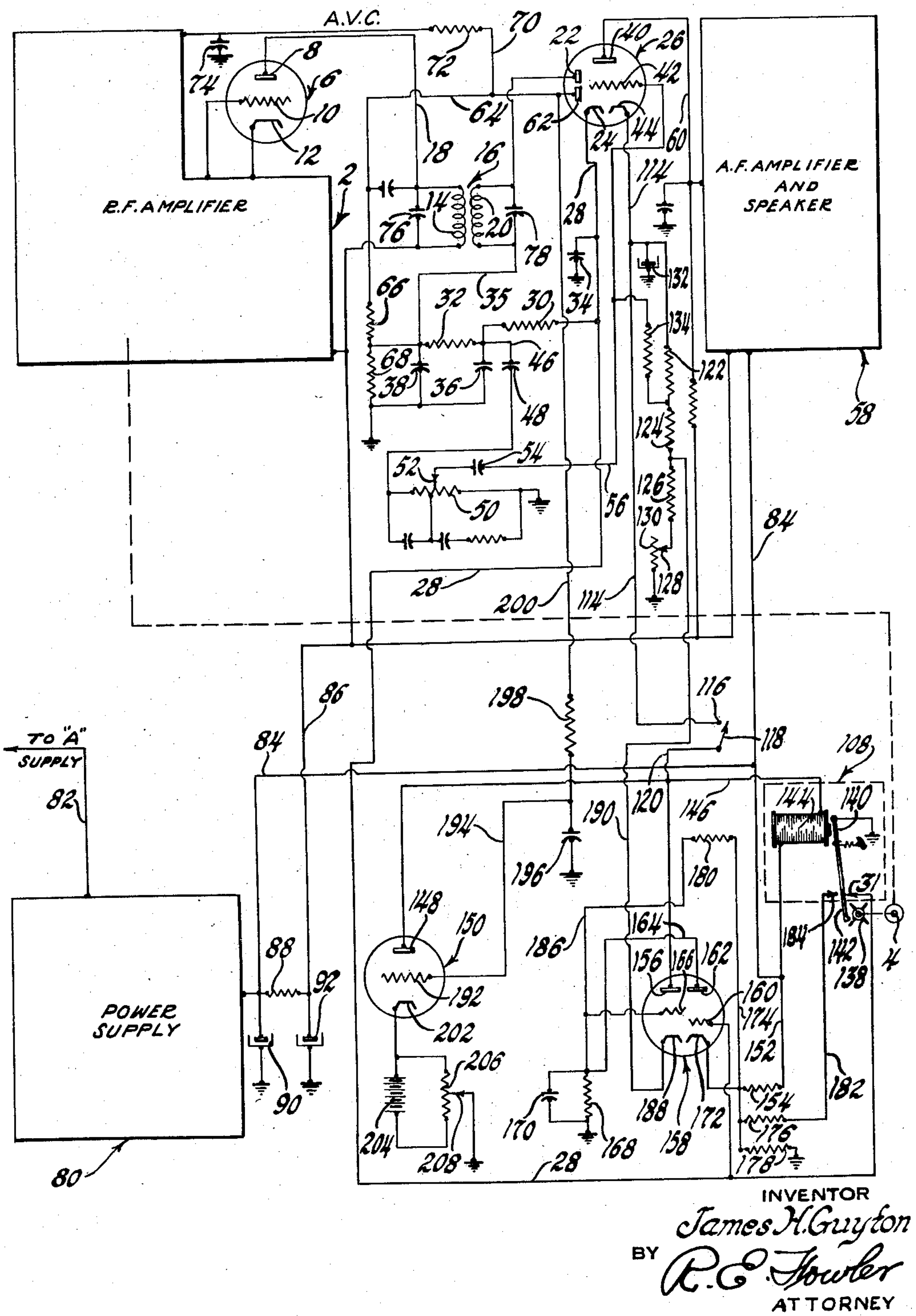
INVENTOR
James H. Guyton
BY R. E. Fowler
ATTORNEY United States Patent Office 2,863,044

Patented Dec. 2, 1958

2,863,044

SENSITIVITY CONTROL FOR SIGNAL SEEKING TUNERS

James H. Guyton, Kokomo, Ind., assignor to General Motors Corporation, Detroit, Mich., a corporation of Delaware Application April 21, 1954, Serial No. 424,662

4 Claims. (Cl. 250—20)

Various means have in the past been provided for automatically tuning radio apparatus to receive the signals from transmitting stations. One of the more popular types is the "signal tuned" or "signal seeking" radio receiver. Motive means is provided to cause the receiver to scan the frequency band for which it is designed in combination with control indexing means to stop the tuner upon receipt of an incoming signal and the operator can then listen to that station. If the program is not suitable, the simple actuation of a switch will again start the tuning action, which will continue until the next signal in order across the band is received, which will again stop the tuner on that signal. The incoming signals, in order to provide a pulse to actuate the stopping cycle, must be of at least a minimum strength.

However, it is desirable to provide some means so that the operator may adjust the sensitivity of the control indexing system so that the tuner will stop on more or less stations as the tuner scans the band. He may wish the tuner to stop only on a few strong local stations and ignore the rest, or he may wish to have it stop on a large number of stations to obtain a greater selection of program.

It is an object in making this invention to provide adjustable means which can be varied to cause a signal seeking tuner to index on different levels of incoming signal strength.

It is a further object to provide easily adjustable means for a signal tuned radio receiver to provide for only indexing on a few strong transmitter signals.

It is a still further object to provide adjustable control means in a signal tuned radio so that the tuner will index on a large number of transmitting station signals.

With these and other objects in view which will become apparent as the specification proceeds, my invention will be best understood by reference to the following specification and claims and the illustrations in the accompanying drawings, in which:

The figure is a block and circuit diagram of a control system embodying my invention.

In a radio receiver there is conventionally provided tuning means that can be moved to tune the receiver over a prescribed frequency band. In signal tuned receivers driving means is provided to cause the tuner to repetitively scan the spectrum. Control means is included which stops the tuning drive upon receipt of an incoming signal. In the present diagram the radio frequency portion of the receiver is illustrated by the block 2 labelled "RF Amp." In this section the radio frequencies are amplified and the tuning means is located. The tuning means is driven by any suitable motive power diagrammatically illustrated as a motor 4, the connection to the tuning means being indicated by the dash line between the motor 4 and the block 2.

The radio frequency amplifier feeds into the last intermediate frequency tube 6, which has an anode 8, grid 10 and cathode 12. The anode 8 is connected to the primary 14 of an intermediate frequency transformer 16 through line 18. The secondary 20 of the transformer 16 has one terminal connected to a diode anode 22 for rectification of the signal on the transformer. The cathode 24, common to the diode elements in the detector-amplifier tube 26, is connected through line 28 to stationary contact 31 of the control relay 108 for certain control functions to be described. Line 28 is connected to one terminal of resistor 30 which, in series with a second resistor 32, is connected back to the other terminal of secondary 20 through line 35, completing the diode input circuit to the detector. Bypass condenser 34 is connected between line 28 and ground. Filter condensers 36 and 38 are connected from opposite ends of resistor 32 to ground.

The incoming signal is therefore amplified in the R. F. amplifier 2 and in the last I. F. amplifier stage 6, and then applied to the I. F. coupling transformer 16, the output of which is rectified by diode 22—24 to provide a detected signal. The detected signal is then applied to an audio frequency amplifier formed by the triode section of tube 26. This section includes anode 40, control grid 42 and cathode 44. Line 46 is connected to the junction between resistors 30 and 32 and to a coupling condenser 48. The opposite side of condenser 48 is connected to a resistor 50, the opposite terminal of which is grounded. A variable tap 52 is adjustable over resistor 50 and acts as the volume control for the receiver. The tap 52 is connected to the control grid 42 through coupling condenser 54 and line 56. This supplies the audio frequency voltage to the first stage of the audio frequency amplifier.

After the signal is amplified by the triode 44—42—40, it is applied to the remaining stages of the audio frequency amplifier and finally to the loud speaker. all indicated by the block 58. This connection is through line 60, interconnecting plate 40 with the amplifier. Automatic volume control for the receiver is provided by a second diode in tube 26. This consists of anode 62 and common cathode 24. The anode 62 is connected through line 64 and two series resistors 66 and 68 to ground. Line 35 is connected to the midpoint between the resistors 66 and 68. The signal developed on line 64 is fed back through line 70 and the resistance 72-condenser 74 time constant circuit, to the R. F. amplifier 2 to control the amplification of the set. The condensers 76 and 78 are connected across the primary and secondary coils 14 and 20 of the intermediate frequency transformer to tune them to the I. F. frequency.

Since the radio receiver here illustratively shown is one designed to be operated in an automobile, a power supply section 80 is shown connected through line 82 to a low voltage source of power, such as a storage battery. Such a power supply unit provides higher voltages to the receiver, as needed, through lines 84 and 86. A filter circuit consisting of resistor 88 and condensers 90 and 92 is connected to lines 84 and 86 to filter out undesired fluctuations. Line 84 extends to the A. F. amplifier 58 and line 86 to both the A. F. and R. F. amplifiers and in addition is connected to I. F. primary coil 14 to supply plate voltage to tube 6.

The cathode 44 of the first audio frequency amplifier stage has a line 114 connected thereto which extends to stationary contact 116 of the initiating switch. The movable arm 118 of the switch is connected to line 120. Line 114 is also connected to one terminal of resistor 122 which is connected in series with two other series resistors 124 and 126. The remote terminal of the resistor 126 is connected to a variable tap 128 on resistor 130, which is grounded. Condenser 132 is connected between line 114 and ground to provide a time constant circuit. A coupling resistor 134 is connected between line 56 and a point intermediate resistors 122 and 124. This provides a time delay on initial closing of the switch 118—116 to assure the tuner moving away from the station to which it has been tuned.

The triggering or indexing system consists generally of a control relay and electronic means for determining the energization or deenergization of the relay conditioned upon incoming signals. The tuning of the receiver is accomplished through some motive or driving means indicated diagrammatically at 4. The driving connection is indicated by the dash line connecting the driving means 4 with the R. F. amplifier 2. The driving means is also shown as turning a toothed index wheel 138. The armature 140 of the relay 108 has a flanged tip 142 engageable with the wheel when the relay is deenergized to stop the driving means and lock the tuner on station. The armature is spring biased to deenergized position. Thus when the relay coil 144 is energized, the armature 140 is moved to the left, as shown in the figure, and the driving means 4 may operate to tune the receiver. However, when coil 144 is deenergized, the tuner will be locked in place.

The coil 144 has one terminal connected to wire 146, which extends to plate 148 of tube 150, and is also connected to line 120. The other terminal of the coil 144 is connected through line 152 with power supply line 84 and also to one terminal of resistor 154. Line 120 is connected to plate 156 of the double triode control tube 158. The line 28 upon which the control pulse is developed is connected to grid 160 of one triode section of the tube. The plate 162 of this same section is connected through line 164 with control grid 166 of the other triode section of tube 158. Line 164 is also connected through resistor 168 to ground. A condenser 170 is connected in shunt to resistor 168.

Cathode 172 of one section is connected to line 174. Line 174 is connected to one terminal of a number of resistors, namely 154, 176, 178 and 180. The opposite terminal of resistor 178 is grounded. The other terminal of resistor 176 is connected through line 182 with a stationary contact 184 on the control relay 108. The remaining terminal of resistor 180 is connected through line 186 to grid 166. The second cathode 188 of the tube 158 is connected through line 190 to a point intermediate resistances 124 and 126.

The grid 192 of triode 150 is connected through line 194 to a point intermediate the condenser 196 and resistor 198 connected in series. The opposite terminal of the condenser is grounded. The opposite terminal of the resistor is connected to line 200, which extends to diode plate 62. The cathode 202 of tube 150 is directly connected to one pole of a biasing battery 204. A resistor 206 is connected directly across the battery. A variable tap 208 on the resistor is connected to ground. This provides an adjustable bias on the cathode 202.

The operation of the system will now be described. The motive means 4 may take any one of a number of different specific forms. It drives the tuning means as indicated by the dashed line to the R. F. amplifier 2. When the receiver is tuned in to a station, the received signal controls means for deenergizing the relay coil 144 as will later be described in detail, and the flanged end 142 of the armature drops into the wheel 138 to stop the motive means on that station. However, as the tuning means proceeds from one extremity to the other, it will be indexed to stop on each signal having sufficient strength to actuate the relay. It is desirable to provide some means for adjusting the sensitivity of the control means to index. The operator may prefer to have the tuner stop only on the strong local stations and ignore the weaker stations, while at other times he may wish to have it index on as many stations as he can. Adjustable means are therefore provided by which the sensitivity of the indexing means can be varied as desired.

The resonant signals received and amplified by the R. F. amplifier 2 are applied by the last I. F. stage, including tube 6, then to the I. F. coupling transformer 16, and are rectified by the detector diode 22—24. The detected signal is developed across resistor 50 and a proportionate part applied to the control grid 42 of the first stage of audio amplification. The audio signal is then further amplified and converted into sound in the A. F. amplifier 58.

A second diode 24—62 also rectifies the high frequency modulated signal and develops a control voltage for automatic volume control which is applied to line 70. The main control voltage pulse for indexing the tuning means is applied through line 28 to control grid 160. The relay coil 144 is deenergized during listening periods and is energized during tuning periods.

Assuming that the system has been connected by suitable switching means to the power supply and the tubes have had an opportunity to warm up, the operator now desires to signal tune the receiver. Switch 118—116 is momentarily closed. This completes an energizing circuit for the relay coil 144 as follows: power line 84, line 152, coil 144, line 146, line 120, switch 118—116, line 114, resistances 122, 124 and 126, tap 128, resistor 130 to ground. The energization of coil 144 moves armature 140 to the left, releasing indexing governor 138, and motor 4 drives the tuning means to scan the band. The switch 118—116 may be released as soon as the tuner has moved and the energizing circuit for the coil 144 is completed alternately through tube 158 as follows: from relay coil 144, line 146, line 120, plate 156-cathode 188, line 190, resistor 126, tap 128, resistor 130, to ground. Thus as long as this triode section is conductive, the relay coil 144 remains energized. As the tuning means tunes in a station a positive control voltage is developed on line 28 which is connected to control grid 160. During tuning this triode section has been biased to cut-off. As the positive voltage is applied to grid 160, the triode 172—160—162 becomes conductive. Current flow through this section varies the voltage on grid 166, driving it downwardly and cutting off flow through triode 188—166—156 to deenergize coil 144, which releases its armature 140, and end 142 moves into engagement with governor wheel 138 to stop the tuning means on that station. If the operator is not satisfied with the program, he again closes switch 116—118 until the tuning means has moved from the station being received, and then releases the switch and the tuner will then stop on the next signal to be tuned in.

The operator may, under different conditions, desire to make the indexing means more or less sensitive to stopping signals. If the receiver is operated in a metropolitan area where there are several local stations of considerable strength, and a high noise level, the operator may wish to have the tuner stop only on such strong local stations. However, if the receiver is to be operated in more remote, quiet areas or under conditions where reception is good, it may be desirable to have the indexing means more sensitive and the set will stop on more stations of listenable quality.

In order to adjust the sensitivity to indexing, there is provided a controllable parallel path to ground from the relay coil 144 beside that through main control triode 188—166—156. This path is through triode 150 and may be traced as follows: line 146, plate 148, cathode 202, resistor 206, tap 208 to ground. The bias on cathode 202 may be varied by moving the adjustable tap 208. Flow through tube 150 is controlled by grid 192 which is connected to the AVC diode 62—24. With the addition of tube 150 in parallel with triode 188—166—156, there are two paths completing the energizing circuit of relay coil 144. The total circuit for energizing coil 144 during tuning therefore is, power line 84, line 152, coil 144, line 146, then either through plate 156, cathode 188, line 190, resistor 126, tap 128 and resistor 130 to ground, or through plate 148, cathode 202, resistor 206 and tap 208 to ground. Thus with the appearance of a stopping pulse on line 28, which would cause such a reduction in conduction in triode 188—166—156 as to normally cause relay coil 144 to drop its armature, the present system provides a second path that may be adjusted to vary this operation. By adjusting the cathode bias on tube 150 so that it continues to conduct current until a large signal appears on its grid, then only strong stations will be indexed by the control relay. Thus the position of tap 208 on the resitsor 206 determines the sensitivity of the indexing means.

Condenser 196 is provided to bypass high frequency voltage to ground. The time constant of resistor 198 and condenser 196 should be less than the time required to tune through a station at the designed tuner speed, but it may be slow enough to give an indication to tube 150 of the approximate signal strength.

If the tap 208 is set to cut off flow through tube 150, then the control tube 158 will index on a large number of stations, providing a sufficient signal to trigger the tuner, but if tap 208 is adjusted to permit certain values of plate current, then only signals of more strength will cause indexing, the value being dependent on the setting.

I claim:

1. In radio receiving means, adjustable means for tuning the receiving means over a predetermined band of frequencies, driving means coupled to said tuning means, indexing means engageable with the driving means to stop and lock the driving means, electronic tube means connected in circuit with the indexing means to control the energization thereof, a control grid in the tube, a conductive line from the receiving means upon which a pulse is developed upon the tuning in of a station said line being connected to said control grid, a second electronic tube connected in shunt to the first, a control grid for the second tube, a second conductive line upon which a similar control voltage proportional to the signal strength is developed as the receiving means is tuned into a station said second conductive line being connected to said control grid in the second tube, the current flow through said combined tubes controlling the energization of the indexing relay.

2. In radio receiving means, adjustable means for tuning the receiving means over a predetermined band of frequencies, driving means coupled to said tuning means, indexing means engageable with the driving means to stop and lock the driving means, electronic tube means connected in circuit with the indexing means to control the energization thereof, a control grid in the tube, a conductive line from the receiving means upon which a voltage is developed upon the tuning in of a station said line being connected to said control grid, a second electron tube connected in shunt to the first, a control grid for the second tube, a second conductive line upon which a similar control voltage is developed as the receiving means is tuned into a station said second line being connected to said control grid in the second tube, the current flow through said combined tubes controlling the energization of the indexing relay and a resistance capacity coupling in said second conductive line connected to said second grid to regulate the voltage.

3. In radio receiving means, adjustable means for tuning the receiving means over a predetermined band of frequencies, driving means coupled to said tuning means, indexing means engageable with the driving means to stop and lock the driving means, electronic means connected to the indexing means to control the energization thereof, a conductive line from the receiving means upon which a voltage is developed upon the tuning in of a station said line being connected to the electronic means to control the flow of current therethrough, adjustable means connected across the electronic means to determine the current flow therethrough as regulated by control voltage and a second conductive line connected to the receiving means upon which a second control voltage is concurrently developed, said second line also being connected to the adjustable means to vary the effect thereof.

4. In radio receiving means, adjustable means for tuning the receiving means over a predetermined band of frequencies, driving means coupled to said tuning means, indexing means engageable with the driving means to stop and lock the driving means, a plurality of electronic means connected in circuit with said indexing means to control the energization thereof each having a control electrode, a plurality of conductive lines connected to different parts of the receiving means upon which different signals are developed upon the tuning in of a station, each line being directly connected to one of the control electrodes of the electronic means to, in combination, control the total conductance of the same and therefore the energization of the indexing means.

References Cited in the file of this patent

UNITED STATES PATENTS

| | | |
|---|---|---|
| 2,217,178 | Masters | Oct. 8, 1940 |
| 2,266,445 | Siegert et al. | Dec. 16, 1941 |
| 2,300,081 | White | Oct. 27, 1942 |
| 2,526,266 | O'Brien | Oct. 17, 1950 |
| 2,541,017 | Alexander | Feb. 13, 1951 |
| 2,550,430 | Schwartz et al. | Apr. 24, 1952 |